United States Patent [19]

Delcoigne et al.

[11] 4,257,710
[45] Mar. 24, 1981

[54] CONTINUOUS PROCESS MIXING OF PULVERIZED SOLIDS AND LIQUIDS AND MIXING APPARATUS

[75] Inventors: Adrien Delcoigne, Chantilly; Jacques Lanneau, Breuil le Vert, both of France

[73] Assignee: Saint Gobain Industries, Neuilly, France

[21] Appl. No.: 3,416

[22] Filed: Jan. 15, 1979

[30] Foreign Application Priority Data

| Feb. 8, 1978 [FR] | France | 78 03473 |
| Feb. 8, 1978 [FR] | France | 78 03474 |
| Feb. 8, 1978 [FR] | France | 78 03475 |

[51] Int. Cl.³ .......................... B28C 7/04; B28C 5/38
[52] U.S. Cl. .................................. 366/8; 366/18; 366/28; 366/40; 366/131
[58] Field of Search ............... 366/16, 8, 17, 18, 19, 366/21, 27, 28, 29, 34, 40, 131, 132, 134

[56] References Cited

U.S. PATENT DOCUMENTS

| 1,476,938 | 12/1923 | Walper . |
| 1,781,255 | 11/1930 | Trouth . |
| 2,007,133 | 7/1935 | Roos . |
| 2,088,813 | 8/1937 | Ross . |
| 2,366,673 | 1/1945 | Paley . |
| 2,538,891 | 1/1951 | Zimmerman . |
| 2,625,381 | 1/1953 | Zimmerman . |
| 2,805,051 | 9/1957 | Miller . |
| 2,915,412 | 12/1959 | Lyons . |
| 3,222,036 | 12/1965 | Franz . |
| 3,343,818 | 9/1967 | Plemons . |
| 3,459,620 | 8/1969 | McCleary . |
| 3,608,869 | 9/1971 | Woodle ........................ 366/132 |
| 3,871,625 | 3/1975 | Iwako . |
| 3,967,815 | 7/1976 | Backus . |
| 3,993,822 | 11/1976 | Knauf . |
| 3,994,480 | 11/1976 | Kelly . |
| 4,057,443 | 11/1977 | Stiling . |

FOREIGN PATENT DOCUMENTS 556314 10/1957 Belgium .
2602858 8/1976 Fed. Rep. of Germany .
1525094 4/1968 France .

Primary Examiner—Robert W. Jenkins
Attorney, Agent, or Firm—Harding, Earley & Follmer

[57] ABSTRACT

The invention deals with continuous process mixing of pulverized solids and liquids. It offers a mixing process comprising:

continuously introducing a liquid into a mixing container;

continuously introducing a solid powder into said container at such a rate that specified proportions of solid and liquid in the mixture are maintained;

rotating the products in the container in such a way as to establish a vortex;

regulating the solid and liquid supply rate in such a way that a given level of filling of container is constantly maintained;

continuously emptying the products mixture so that level of filling is maintained.

It offers as well a mechanism to implement the process including a mixing container having an intermediate bottom and a runoff opening, a turbine mounted above the intermediate bottom, and mechanism for supplying a liquid and a solid. Advantageously, the liquid is used to wash down the walls of the mixing container and may be applied to parts of the turbine to avoid retention of solids in the container. It can be applied to hydraulic binders preparations and specifically to continuous process preparation of a plaster and water mixture.

48 Claims, 5 Drawing Figures

CONTINUOUS PROCESS MIXING OF PULVERIZED SOLIDS AND LIQUIDS AND MIXING APPARATUS

TECHNICAL FIELD

This invention is in the field of mixing solids and liquids.

BACKGROUND OF PRIOR ART

The present invention deals with the mixing of pulverized solids and liquids and can be applied, for example to hydraulic binders preparation and specifically to the continuous process preparation of a plaster powder and water mixture.

It is a widespread practice, in order for the mixing of pulverized solids and liquids, to use mixers having teeth or blades and consisting of a cylindrical container having a vertical shaft fitted with one or several sets of revolving radial arms bearing blades or teeth. These blades or teeth scrape the container's walls, mix the products and thus operate a stirring. But such mixers do not provide a satisfactory dispersion of pulverized solid into the liquid; hence there is a lack of homogeneity in the fluidity of the discharged mixture. On the other hand, there are turbine mixers consisting of a container in which a disc, a propeller or a turbine is revolving at very high speed. The solid and the liquid reach the turbine which disperses them instantly. Contrary to teeth mixers, turbine mixers achieve a high shearing rate and an intensive turbulence in all points of the system, so that product dispersion and homogenization are satisfactory. But the study of such a mixer's performance, through the introduction of some colored substance, or generally any tracer substance which can easily be detected, reveals that a variation in the supply is reflected without any change at the outlet after a very brief delay of the order of one second. Thus, in a turbine mixer, the time during which the product remains in the mixer is very short, indeed, so short that irregularities in supply are not suppressed by the mixing operation and still exist unchanged at outlet. When an even fluidity of final product is desired, which is impossible to obtain through evenness of supply, turbine mixers will not be satisfactory.

The present invention obviates the drawbacks of both known systems; it makes it possible to provide a continuous process mixing of pulverized solids and liquids with an even fluidity.

In addition this invention overcomes the problem of premature setting of a fluid evolutive product in the mixer. A fluid evolutive product is a liquid in which a reaction resulting in a physical or chemical transformation takes place producing a solid phase or modifying the characteristics of a solid phase initially carried by the liquid. A plaster powder and water mixture is exemplary of such a product.

BRIEF SUMMARY OF THE INVENTION

The invention offers a continuous mixing process of pulverized solids and liquids comprising:
  introducing in continuous process the liquid phase in a mixing container;
  introducing in continuous process the solid phase in said container at such a rate that desired proportions of solid and liquid are observed;
  providing for the rotation of products contained in the container in such a way as to establish a vortex;
  regulating solid and liquid supply rates in such a way that a given level of container filling is constantly maintained;
  emptying in continuous process the products mixture so that level of filling is maintained.

The process also advantageously uses the liquid introduced in the container to wash down the water of the container to prevent the formation of solids. Preferably the mixed product is withdrawn along the lower walls of the container to avoid the retention of solids in the container.

A sustained running is established after a starting phase including the following steps:
  introduction in a mixing container or tank of liquid and solid in accordance to a weight ratio selected beforehand, up to reaching a given filling level of said mixing container;
  stirring in the container the introduced products and sustaining of stirring for a selected period of time;
  And then at the same time: continuous process intake, in the container, of liquid and solid at predetermined rates so that the mixture weight ratio is observed; and
  continuous process emptying of the mixing container at such a rate that the filling level is maintained.

With given rates of introduction of solid and liquid, the mixing container filling level determines the mean time during which the products to be mixed remain in the mixing container and said mean time of stay is at least equal to 3 seconds and is preferably set between 15 and 30 seconds.

As a typical example, the process may be used for continuous process mixing of plaster powder and water.

In addition, the invention offers a mechanism to implement the mixing process. Such a mechanism comprises a mixer characterized by the fact that it includes various combinations of the following:
  a container made from a hollow solid of revolution whose lower end is equipped with an outflow opening and outflow rate regulating means, said container being fitted with an inner wall constituting an intermediate bottom with its side edges spaced away from the side wall of the container; a turbine mounted within the container above the intermediate bottom and revolving around a vertical axis placed along the container's axis; liquid supply means advantageously including means for supplying liquid to the side wall of the container and to the shaft of the turbine; and solid supply means for supplying a solid to the container.

DETAILED DESCRIPTION OF THE INVENTION

Figure 1:
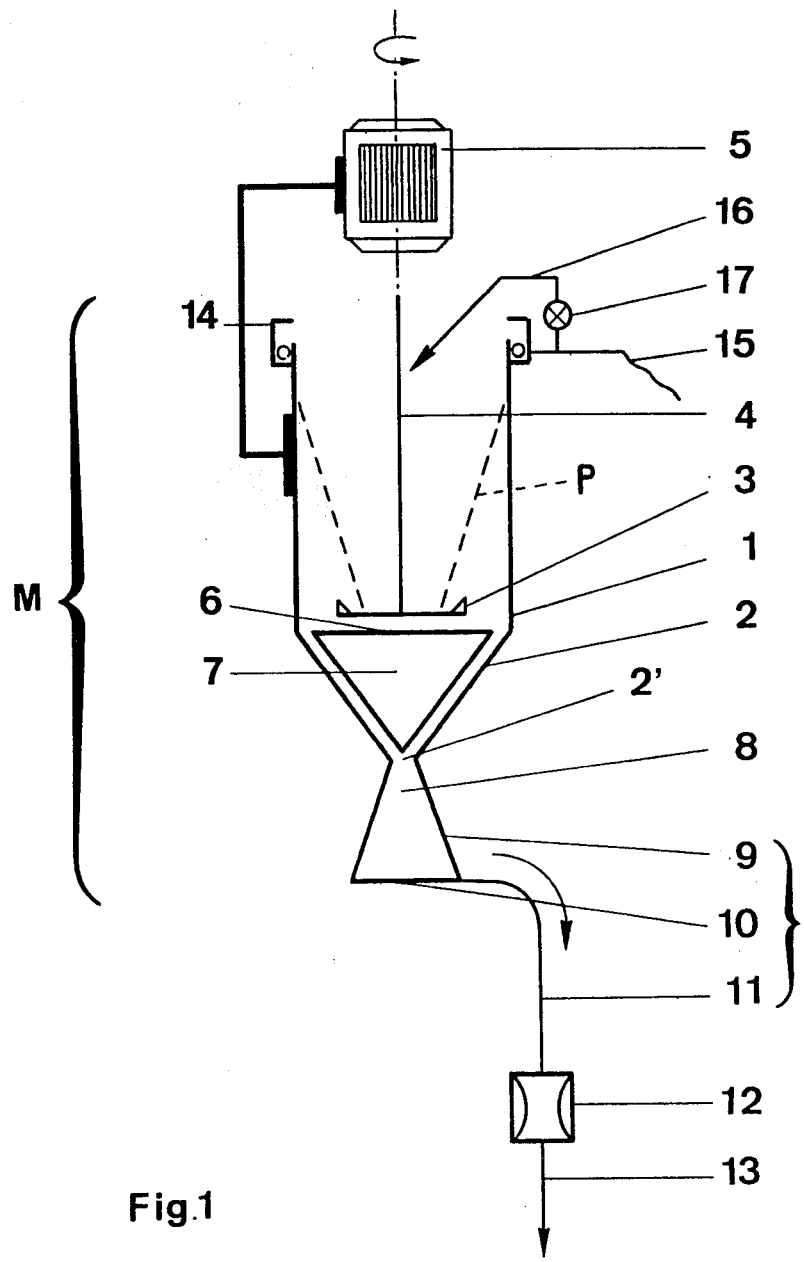
FIG. 1 is a sketch of mixing mechanism.
Figure 3:
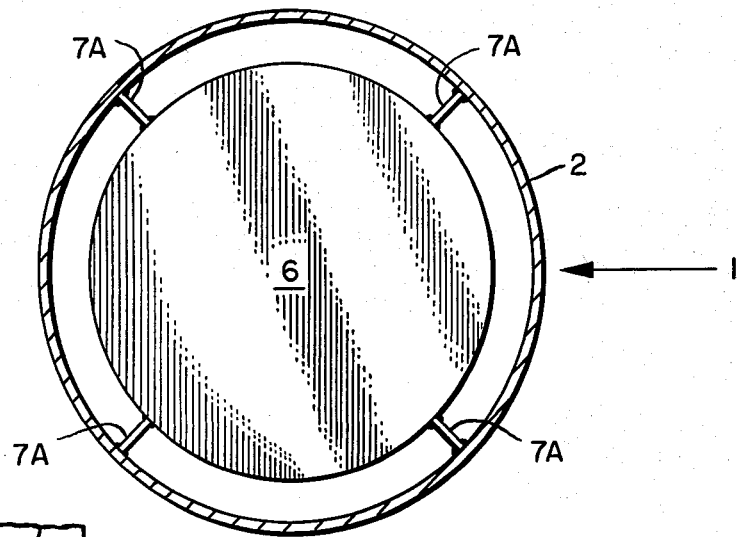
FIG. 3 is a horizontal section taken immediately above the cone in the mechanism of FIG. 1.

Referring to FIG. 1, a mixer M for pulverized products and liquids has a vertical cylindrical container or tank 1 tapered in its lower section 2 to lead to a drainage opening 2'. A turbine 3 is mounted on the side of tank 1 with its impeller inside of container 1 on a vertical shaft 4 placed along the container's axis and driven by a motor 5. There is a container intermediate bottom 6 constituted by the top surface of a cone 7 designed to create an obstruction inside lower tapered section 2 of container 1. This obstruction is a solid of revolution whose lower section is tapered. It is centered along the container's axis and its dimensions are smaller than the inner dimensions of lower tapered section 2 of the mixer, thus providing a ring shaped opening between it and the lower section 2 of container 1. Cone 7 is a cone with its point down inside of lower tapered section 2 of the container which also is in the shape of a cone, with the intermediate bottom 6 constituted by the flat base of said inverted cone. Cone 7 is supported by bars 7 A which appear in FIG. 3.

The lower section 2 of the mixer leads to an inverted cyclone shaped ejection device 8, i.e. constituted by conical casing 9 mounted with its point up, with flat base 10 and a collector pipe 1 whose end is flush with base 10, tangential to conical casing 9 and extending in the direction of rotation of turbine 3. This collector pipe 11, then runs vertically downward and is equipped with flow rate regulating valve 12 which brings the mixture to a pipe 13 leading to mixture utilization facilities (not shown). Valve 12 may be, for example, a modulated pressure controlled elastic sleeve valve for the type disclosed in our copending application entitled "Process and Mechanism for Evolutive Pulp Flow Regulation" and filed concurrently with this application, the disclosure of said application being incorporated herein by reference. The top rim of container 1 is fitted with a covered ring-shaped pouring spout 14, supplied with liquid through a flexible hose 15. A pipe 16 connected to flexible hose 15 and equipped with a regulating valve 17 directs liquid at shaft 4 of turbine 3 to keep it clean. By way of specific illustration a mixer with the following specifications can deliver from 30 to 65 KG/MN of mixture:

Speed of our turbine: 1275 revolutions/mn
Diameter of the turbine impeller blade: 150 mm
Diameter of the mixer: 292 mm
Height of the mixer top above the intermediate bottom: 485 mm
Angle of the top of the cone: 145 degrees
Diameter of the outlet of the mixer: 35 mm
Distance between turbine blade and intermediate bottom: 15 mm
Angle of the bottom of the mixer, about: 145 degrees.

Figure 2:
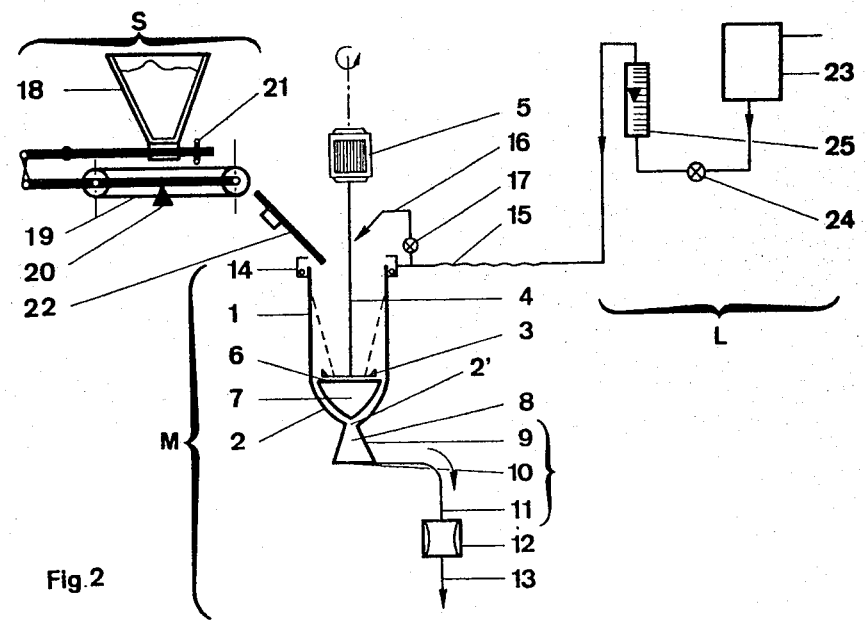
FIG. 2 is a schematic showing of the supply and mixing mechanism.

FIG. 2 shows a complete mixing installation. Elements already described, such as mixer M with its container 1, its obstructing cone 7 inside of the container tapered section 2, intermediate bottom 6 constituted by the top part of cone 7, ring shaped opening between cone 7 and container lower section 2, inverted cone shaped ejection device 8, collector pipe 11 equipped with outcoming mixture flow rate regulating valve 12, liquid supply through pouring spout 14 and pipe 16, and turbine 3 driven by motor 5 are there. Pulverized solid supply system S and a liquid supply system L for mixer M are shown in FIG. 2. The solid supply system S includes a hopper 18 mounted above a weight sensitive conveying belt 19, balanced on a knife 20 when loaded with a selected weight of product. Such a device is known as a constant weight weight-sensitive conveyor. This weight-sensitive conveyor 19 is combined with a trap 21 for regulating the thickness of the layer of powder supplied by hopper 18. A vibrating metallic channel 22 equipped with an overlying screen is mounted below the discharge end of the constant weight-sensitive conveyor 19. This channel is inclined in relation to the horizontal direction at an angle which depends on the pulverized product and which for plaster powder, will be preferably approximately 45 degrees. Channel 22 is mounted in such a way that its lower end hangs over container 1 of mixer M and that the powder brought by it falls into the center of container 1 on turbine 3. The solid supply system S is known to the art so it need not be further detailed.

In the liquid supply mechanism L of FIG. 2, liquid supply is effected from a constant level tank 23; a regulation of liquid flow rate is insured by a valve 24, a flow-meter 25 making it possible to control the rate of flow into hose 15 with precision.

The mixing facility operates as follows. Plaster powder (P) will be taken as example of the pulverized solid and water (W) as example of the liquid.

Prior to the start, a ratio Wo/Po is selected, Wo and Po being respectively the mass flow rate of water (Wo) and the mass flow rate of plaster powder (Po) which flow rates are first set. The water flow rate is regulated by valve 24 to selected Wo value. Then the plaster flow rate is regulated at Po value: plaster powder contained in hopper 18 spreads on constant weight weight-sensitive conveyor 19 set in equilibrium on knife 20 for a selected weight of product in tank 1, and then flow rate Po is obtained by regulating the translation speed of the weightsensitive conveyor 19. A length of stay To of mixed plaster in mixer container 1 is selected. Rotation of turbine 3 is started. Mixer container 1 is closed by plugging pipe 13 or by closing valve 12. Liquid supply mechanism L, adjusted to supply a flow rate Wo is opened for the time To selected. Water is introduced through pouring spout 14, and through pipe 16. By turning at high speed, turbine 3 stirs up the water. At the end of time To, the water supply is shut off. Then the plaster powder supply mechanism S, adjusted for a flow rate Po, is put in operation for a period of time To. At the end of time To, the plaster powder supply is shut off.

Turbine 3 is allowed to mix water and plaster powder for a period of time of approximately To/2 starting with plaster powder supply shutoff. Then, after this mixing time To/2, at the same time,, the water supply, still adjusted for a flow rate To, is opened, the plaster supply still adjusted for a flow rate Po is opened, mixture contained in the mixer container is allowed to run out either by opening pipe 13 or by opening valve 12, and by adjusting valve 12 so that the amount of product in the mixer M remains constant and equal to the amount present in the container at startup. Thus, a permanent running condition is quickly reached. Water and plaster powder supply is in continuous process with respective flow rates Wo and Po, mixing is continuous, a constant amount of mixture remains in the mixer container, the average time of stay of the mixture in mixer is constant and equal to time To selected at start, and running off of mixture is also a continuous process with a (Wo+Po) flow rate.

Water introduced into ring-shaped pouring spout 14 is uniformly distributed all around it and overflows along the inner wall of container 1. Water from pipe 16, controlled by valve 17, sprays and cleans shaft 4 of turbine 3. Plaster powder contained in hopper 18 spreads on constant weight-sensitive conveyor 19 balanced on knife 20. The weight-sensitive conveyor 19 being set for a flow rate Po, any temporary oversupply or undersupply of plaster powder results in an unbalance which leads to a change of position of trap 21 for regulation of the thickness of the plaster powder layer, a change which tends to reestablish balance.

At the end of weight-sensitive conveyor 19, plaster powder falls on the screen that covers vibrating metallic channel 22, breaking into blocks and plaster powder runs into channel 22. The channel 22, through its vibrations, spreads the plaster powder and then forces it through a spout formed in its end to fall into turbine 3 revolving at high speed inside of container 1 of mixer M. The sheet of water formed on the wall of container 1 and the water sprayed on turbine shaft 4 prevent any deposit of plaster and any unwanted beginning of setting of plaster on container 1 wall and on shaft 4.

High speed revolving turbine 3 moves the powder and water inside container 1. The turbine speed is set so that a single vertical axis vortex becomes established, i.e. a hollow whirlpool covering the inside of the tank walls. Then the outer surface of the mixture assumes a conical form as indicated at P, centered on shaft 4 of turbine 3.

Vortex depth depends on geometric data of mixer M container 1 and on the revolving speed of turbine 3 which is adjusted so that bottom of the vortex touches turbine 3 and eliminates any dead spots of mixture on bottom 6. This optimal speed depends on mixture fluidity, which is a function of ratio:

Wo/Po and of To.

With too low a speed there is an excessive covering of the turbine blade by the mixture and an excessively flat surface of the mixture on which blocks of solid powder may remain because the powder is not dispersed.

On the other hand, too high a speed tends to hollow out the vortex excessively so as to uncover all of turbine 3 and to cause the mixture to climb too high along the container 1 wall, the latter falling back periodically on the turbine 3 and thus causing an irregular revolving motion.

Plaster powder supplied by vibrating channel 22 falls in the center of the vortex upon turbine 3 revolving at high speed. It is instantly dispersed and projected outwardly into the preexisting mixture in container 1.

Rotation of the mixture insures homogenization, and the slope of the liquid surface prevents stagnation of solid products in agglomerates. The plaster/water mixture assumes turbine 3 flow lines, i.e. mixing zone circulation lines adjacent intermediate bottom 6. Thus, there is no deposit forming on the intermediate bottom 6 because the mixture sweeps across it. The plaster/water mixture flows out of the tank in an even manner through the ring-shaped space between obstructing cone 7 and mixer lower section 2 wall without leaving any solid residue. The position of cone 7 in relation to mixer lower tapering section 2 wall defines the dimensions of this ring-shaped space and thus determines a limit on the flowing-off of the contents of the container 1. The mixture flows off through this space with a sufficient speed so as not to induce setting of the mixture. When cone 7 is a cone and when mixer tapered section 2 outer wall is itself conical, plaster mixture speed as measured along cone 7 is preferably at least 30 cm (11.81 in.) /second and generally about 1 m (3.28 ft.) /second. Sections of mixture runoff piping located downstream is selected so that this minimal speed can be reached, thus preventing premature deposits and mass setting of the mixture.

The mixture gathers toward opening 2' of mixer lower section 2 with the mixture still revolving as it flows into inverted cyclone-shaped ejection device 8. The mixture hugs the conical walls of the device 8 and flows down along these walls as far as base 10 in a spiral descent. This way, no uncontrolled vortex is likely to create a motionless zone where mass setting could occur. Then the mixture in rotating flow is received in collector pipe 11 and forms a full cylindrical stream whose rate of flow can be accurately regulated by flow regulating valve 12 located at the end of collector pipe 11.

However, since supply flow rates Po and Wo are not perfectly stable and may be subject to fluctuations which would result in mixture fluidity fluctuations, valve 12 is constantly adjusted to maintain a constant amount of mixture in mixture container 1 and hence a constant time of stay of the mixture in the mixer. This time of stay makes it possible for the mixture to be homogenized and for the supply unevenness to be suppressed.

The setting of valve 12 can be arrived at in several ways. It may be a manually set one, but in the case of plaster, taking into account pulverized plaster's rapid evolution process as soon as it mixes with water, if a constant fluidity mixture must be available, consistent with a very precise time of stay in mixer, it preferably is automatically set as by weighing the mixer, for example, as set forth in our aforesaid co-pending application entitled "Process and Mechanism for Evolutive Pulp Flow Regulation".

Valve 12 may, for example, be a direct channel valve having a rigid housing, an elastic inner sleeve, and a fluid intake between rigid housing and sleeve, said fluid being capable of compressing the elastic sleeve to decrease the valve flow rate. In order to prevent any plaster deposit or mass setting in such a valve it is advantageous to modulate the control fluid pressure as disclosed in our aforesaid co-pending application entitled "Process and Mechanism for Evolutive Pulp Flow Regulation".

It is beneficial to control the valve 12 with a pneumatic escape type regulating mechanism that causes a variation of valve 12 opening as a function of the weight of the mixer and use oscillations induced by vibrations resulting from mixture and turbine motion in the mixer container. Such an escape pneumatic mechanism includes essentially a pneumatic circuit and a force balance beam. The pneumatic circuit is supplied with a constant compressed air flow; it includes two branches, one of them leading to valve 12, the other one having a nozzle for which the balance beam acts as a flapper plate, thus providing a certain escape of air that varies with the position of the beam. Thus, the balance beam is constantly monitoring the mixer's weight. Its equilibrium is set for a determined weight of the mixer and is disturbed when this weight varies. It then causes an increase or a decrease of pneumatic circuit fluid escape and consequently, causes a decrease or an increase of the pressure of air directed toward the valve, thus modifying the valve aperture and consequently the flow rate from the mixer. In addition, the turbine motions make the beam vibrate and faintly oscillate continuously and these faint oscillations are picked up by the pneumatic circuit and create valve control fluid pressure modulation to change the shape of the elastic sleeve and vibrate it. Since the valve elastic sleeve is constantly changing shape, no plaster deposit whatsoever can form there. Such a pneumatic escape type regulating mechanism is disclosed in our aforesaid patent application entitled "Process and Mechanism for Evolutive Pulp Flow Regulation".

Figure 5:
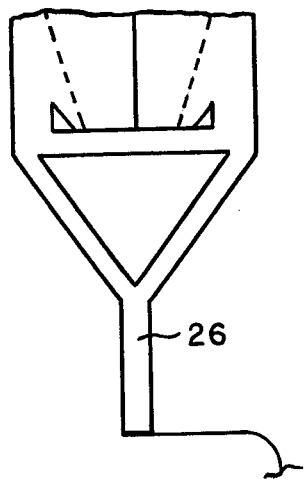
FIG. 5 is a schematic drawing of part of a mixer having an impact crown ejector.
Figure 4:
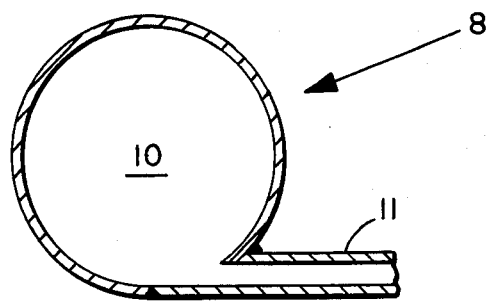
FIG. 4 is a horizontal section taken immediately above the bottom of the ejection of the mechanism of FIG. 1.

The ejection device 8 can be any standard fluid mechanic means which has the capacity of transforming any flux whatsoever, and particularly a revolving flux, into a full stream. Thus, a cylindrical impact crown 26 in FIG. 5, made from a cam with a bottom and a lateral discharge pipe can be used.

Retention time To must always remain shorter than a value Tp corresponding to the start of setting of the mixture. Once supply flow rates Po and Wo and hence running off rate (Po+Wo) are set, this mean retention time To is determined by the mixing container filling level, and it is by maintaining this filling level that mean retention time is kept constant. Mean retention time is at least three seconds and preferably between 15 and 30 seconds in order for a satisfactory homogenization of solid and liquid products to be achieved.

So far a plaster powder and water mixture has been described, but the process remains the same and mechanism operates in the same manner if additives are added at one of the various mixing steps, additive being understood as reactive or inert, solid or liquid products, preferably finely powdered for the solid ones. Thus, it is possible to introduce solid additives with pulverized plaster, either with addition made beforehand by the plaster powder manufacturer, or by spreading the additive in hopper 18 or on weight-sensitive conveyor belt 19. It is also possible to introduce solid or liquid additives into the water, or else directly into the mixer. Said additives can be chemical catalyst, or plaster reinforcing elements such as chopped or finely divided fibers.

Thus, it is necessary to take the words "plaster powder" and "water" in a broader sense, and to use terms such as solid phase or solid to designate plaster powder by itself and mixtures of plaster with other solids, and to use terms such as "liquid phase" or "liquid" to designate water by itself as well as water containing solid or liquid additives.

CROSS-REFERENCE TO RELATED APPLICATIONS

This application is related to our copending and concurrently filed patent applications, the disclosures of which are incorporated herein by reference, entitled "Process and Mechanism for Evolutive Pulp Flow Regulation" and "Plaster Board and Process and Device for Making Plaster Board".

We claim:

1. A continuous process for mixing pulverized solids and liquids such as plaster powder and water characterized in that it comprises:
   continuously introducing the liquid in a mixing container at a selected flow rate,
   continuously introducing the pulverized solid in said container at a selected flow rate,
   said flow rates being selected to provide a desired proportion of solid and liquid,
   rotating the solid and liquid in the container in order to create a vortex thereof,
   withdrawing the thus mixed solid and liquid from the container and controlling the rate of withdrawing such that a desired level of the mixture in the container is maintained, the mean stay time for the mixture in the mixing container being determined by the said level of the mixture in the container.

2. A continuous process for mixing pulverized solids and liquids such as plaster powder and water characterized in that it comprises:
   continuously introducing the liquid in a mixing container at a selected flow rate,
   continuously introducing the pulverized solid in said container at a selected flow rate,
   said flow rates being selected to provide a desired proportion of solid and liquid,
   rotating the solid and liquid in the container in order to create a vortex thereof, and
   withdrawing the thus mixed solid and liquid from the container at a rate such that the desired level of the mixture in the container is maintained,
   said process being further characterized in that its starting period includes the following steps:
   introducing the liquid and solid into the mixing container in a weight ratio selected beforehand until a selected filling level of said mixing container is reached,
   rotating the liquid and solid in the container and maintaining the rotating motion for a selected time, and then, at the same time continuously introducing into the container liquid and solid at flow rates such that weight ratio of the mixture is maintained, and continuously withdrawing the mixture from the container at a flow rate that will maintain the filling level.

3. A process according to claim 2 characterized in that the ratio of pulverized solid to water is 100 to 80 by weight.

4. A process according to claim 2 characterized in that the means stay time for products to be mixed in the mixing container is determined by said container filling level.

5. A process according to claim 1 characterized in that the mean stay time for products to be mixed in the mixing container is at least equal to 3 seconds and preferably from 15 to 30 seconds.

6. A process according to claims 1, 2, 3, or 4 characterized by the fact that mixture is passed into an ejection device and is discharged at the periphery of the ejection device.

7. A process according to claim 6 characterized in that the pulverized solid is plaster and the liquid is water.

8. A process according to any of claims 1-3, 4 and 5 characterized in that the withdrawing is done through the bottom of the mixing container.

9. A process according to claim 8 characterized in that the pulverized solid is plaster and the liquid is water.

10. A process according to any of claims 1-3, 4 and 5 characterized by the fact that at least a portion of the liquid is introduced along the interior of the mixing container wall in order to create a continuous sheet of liquid around said wall and by the fact that the withdrawing is done through the bottom of the mixing container.

11. A process according to claim 10 characterized in that the pulverized solid is plaster and the liquid is water.

12. A process according to any of claims 1-3, 4 and 5 characterized in that the pulverized solid is introduced into the center of the vortex, at least a portion of the liquid is introduced along the interior of the mixing container wall in order to create a continuous sheet of liquid aroung said wall, and the withdrawing is done through the bottom of the mixing container.

13. A process according to claim 12 characterized in that the pulverized solid is plaster and the liquid is water.

14. A process according to any of claims 1-3, 4 and 5 characterized in that solid or liquid additives are introduced in the liquid.

15. A process according to claim 14 characterized in that the pulverized solid is plaster and the liquid is water.

16. A process according to claim 14 characterized in that the solid additives are introduced in solid phase.

17. A process according to claim 16 characterized in that the pulverized solid is plaster and the liquid is water.

18. A process according to any of claims 1-3, 4 and 5 characterized in that solid or liquid additives are introduced into the mixer.

19. A process according to claim 18 characterized in that the solid additives are introduced in solid phase.

20. A process according to claim 19 characterized in that the pulverized solid is plaster and the liquid is water.

21. A process according to claim 18 characterized in that the pulverized solid is plaster and the liquid is water.

22. A process in accordance with any of claims 1-3, 4 and 5 characterized in that the pulverized solid is plaster and the liquid is water.

23. A vertical mixer, for pulverized solids and liquids characterized in that it comprises: a container formed by a hollow solid of revolution and equipped in its lower end with a run-off opening, run-off flow rate regulation means in communication with said run-off opening, said container having an intermediate bottom spaced from the interior of the side wall of the container, a turbine mounted inside of the container above the intermediate bottom and revolving around a vertical axis on the container's axis, means for continuously supplying a liquid in the container and means for continuously supplying a pulverized solid to the container.

24. A mixer according to claim 23 characterized in that the intermediate bottom offers a top surface whose shape assumes corresponding top mixing zone flow lines.

25. A mixer according to claim 23 characterized in that the intermediate bottom offers a flat top surface which is perpendicular to the container's axis and is placed in the immediate vicinity of the turbine.

26. A mixer according to claim 23 characterized in that the intermediate bottom has a depending circular wall centered on the container's axis and with a diameter smaller than said container inner diameter.

27. A mixer according to claim 23 characterized in that the container has the form of a vertical cylinder with a downward extension which tapers toward the run-off opening.

28. A mixer according to claim 27 characterized in that the intermediate bottom is located at the level where the cylinder and tapered extension of the container are joined.

29. A mixer according to claim 20 characterized in that the intermediate bottom is constituted by the top surface of a downward tapered solid of revolution core placed inside of the container's tapered extension and centered on said container's axis, said core having a section smaller than the container's extension in order to provide for a ring shaped space in cross-section between it and said container's inner wall.

30. A mixer according to claim 29 characterized in that the core placed inside the container's extension is a straight cone positioned with its tip down and whose flat base constitutes the intermediate bottom, the container's tapered extension also being conical.

31. A mixer according to claim 29 characterized in that the run-off valve flow regulation means is an elastic sleeve valve which is placed downstream of an ejection device in communication with the container run-off opening, said ejection device receiving the mixture discharging from the container and transforming its flow into a full stream for entry into the valve.

32. A mixer according to claim 31 characterized in that the ejection device is shaped like an inverted cyclone having a conical casing placed with its tip upward with an inlet at the tip of the cone and has a flat base, and a collector pipe comes out of the ejection pipe flush with said base and tangentially to the comical casing in the direction of rotation of the turbine.

33. A mixer according to claim 31 characterized in that the ejection device is an impact crown formed by a vertical can with a bottom and a lateral discharge pipe.

34. A mixer according to claim 23 characterized in that the run-off flow regulation means is an elastic sleeve valve.

35. A mixer according to claim 23 characterized in that the pluverized solid supply means comprises: a supply hopper for a pulverized solid, trap means for regulating flow from the hopper, a constant weight weight-sensitive conveyor belt upon which pulverized solid from the hopper is poured and whose unbalance results in a change of trap means position, and a flow rate regulating means for receiving pulverized solid carried by the weight-sensitive conveyor belt comprising a vibrating spout.

36. A mixer according to claim 23 characterized in that the liquid supply means comprises: a ring-shaped pouring spout adjacent the top of the container and distributing liquid along the inside of the container's side wall, a tube directed toward the shaft of the turbine to discharge liquid thereon, and valve means for regulating the rate of flow.

37. A mixer according to claim 23 characterized in that the turbine is placed in the immediate vicinity of the intermediate bottom top surface.

38. A vertical mixer for pulverized solids and liquids comprising: a container in the form of a vertical cylinder with a downward extension which tapers toward its lower end which has a run-off opening, a downwardly tapered core in the downward extension of the container providing for a ring-shaped space in cross-section between it and the container's inner wall and its top providing an intermediate bottom at the level of the junction of the cylinder portion and tapered extension of the container, a turbine mounted inside of the container immediately above the intermediate bottom formed by the core, an ejection device in communication with the run-off opening for transforming the discharge from the run-off opening into a full stream, an elastic sleeve valve in communication with the ejection device and downstream thereof for run-off flow rate regulation, means for continuously supplying a liquid to the container including a ring-shaped pouring spout adjacent the top of the container and distributing liquid along the inside of the container's side wall, a tube directed toward the shaft of the turbine to discharge liquid thereon, and valve means for regulating the rate of flow, and means for continuously supplying a pulverized solid to the container including a supply hopper for a pulverized solid, trap means for regulating flow from the hopper, a constant weight weight-sensitive conveyor belt upon which pulverized solid from the hopper is poured and whose unbalance results in a change of trap means position, and a flow rate regulating means for receiving pulverized solid carried by the weight-sensitive conveyor belt comprising a vibrating spout.

39. A continuous process for mixing pulverized solids and liquids such as plaster powder and water characterized in that it comprises continuously introducing liquid into a mixing container at a selected flow rate, continuously introducing pulverized solids into said container at a selected flow rate, said flow rates being selected to provide a desired proportion of solid and liquid, rotating the solids and liquid in the container to create a vortex thereof and a mixture of the solids and liquid, rotating the mixture through a ring-shaped space in the container in a spiral descent into a discharge opening, and continuously passing the mixture through the discharge opening.

40. The continuous process of claim 39, said ring-shaped space tapering toward the discharge opening, and rotating the mixture downwardly through the tapered space in ever decreasing circles in its spiral descent.

41. The continuous process of claim 39, the speed of the mixture being rotated through the ring-shaped space being at least 30 cm per second to prevent premature deposits and mass setting of the mixture.

42. The continuous process of claim 39, the speed of the mixture being rotated through the ring-shaped space being about 1 meter per second to prevent premature deposits and mass setting of the mixture.

43. The continuous process of claim 39, the mean time of the solids and liquids in the container being about 15 to 20 seconds.

44. The continuous process of claim 39, the time of the solids and liquids in the container being about 3 seconds.

45. The continuous process of claim 39, including introducing at least a portion of the liquid along the interior of the mixing container wall in order to create a continuous sheet of liquid on said interior wall.

46. The continuous process of claim 39, including regulating the output flow of the mixture.

47. A continuous process for mixing pulverized solids and liquids such as plaster powder and water characterized in that it comprises continuously introducing liquid into a mixing container at a selected flow rate, continuously introducing pulverized solids into said container at a selected flow rate, said flow rates being selected to provide a desired proportion of solid and liquid, rotating the solids and liquid in the container to create a vortex thereof and a mixture of the solids and liquid, rotating the mixture through a ring-shaped space in the container in a spiral descent into a discharge opening, and continuously passing the mixture through the discharge opening, said process including passing the mixture from the discharge opening into an ejection zone and rotating the mixture in the ejection zone, and discharging the mixture tangentially from the ejection zone into a collector pipe 48. A continuous process for mixing pulverized solids and liquids such as plaster powder and water characterized in that it comprises continuously introducing liquid into a mixing container at a selected flow rate, continuously introducing pulverized solids into said container at a selected flow rate, said flow rates being selected to provide a desired proportion of solid and liquid, rotating the solids and liquid in the container to create a vortex thereof and a mixture of the solids and liquid, rotating the mixture through a ring-shaped space in the container in a spiral descent into a discharge opening, and continuously passing the mixture through the discharge opening, said process including said ejection zone having an inverted cone shape, and revolving the mixture in ever widening circles in the ejection zone in a spiral descent to the discharge opening so that no uncontrolled vortex is likely to create a motionless zone where mass setting could occur.

* * * * *